US009166337B2

(12) United States Patent
Boswell et al.

(10) Patent No.: US 9,166,337 B2
(45) Date of Patent: Oct. 20, 2015

(54) EXTERNALLY LATCHING I/O HOUSING

(71) Applicant: NVIDIA CORPORATION, Santa Clara, CA (US)

(72) Inventors: Trevor Boswell, Mountain View, CA (US); Ravi Adusumilli, East Palo Alto, CA (US); Eric McSherry, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 117 days.

(21) Appl. No.: 13/718,282

(22) Filed: Dec. 18, 2012

(65) Prior Publication Data

US 2014/0168883 A1 Jun. 19, 2014

(51) Int. Cl.
*G06F 1/16* (2006.01)
*H01R 13/639* (2006.01)

(52) U.S. Cl.
CPC .................................. *H01R 13/6395* (2013.01)

(58) Field of Classification Search
CPC . H05F 7/1401; H01R 13/447; H01R 13/4538
USPC .............................. 361/679.43; 439/308, 367
See application file for complete search history.

(56) References Cited

U.S. PATENT DOCUMENTS

| | | | | |
|---|---|---|---|---|
| 4,774,390 | A * | 9/1988 | Lehman et al. | 200/304 |
| 5,190,465 | A * | 3/1993 | Davidge et al. | 439/304 |
| 5,575,677 | A * | 11/1996 | Buckner et al. | 439/373 |
| 5,640,309 | A * | 6/1997 | Carney et al. | 361/801 |
| 5,769,646 | A * | 6/1998 | Cavello et al. | 439/136 |
| 5,837,942 | A * | 11/1998 | Becker | 174/138 F |
| 5,879,173 | A * | 3/1999 | Poplawski et al. | 439/138 |
| 6,238,242 | B1 * | 5/2001 | Hwang | 439/545 |
| 6,485,316 | B1 * | 11/2002 | Chen | 439/135 |
| 6,589,064 | B1 * | 7/2003 | Chen | 439/304 |
| 6,935,875 | B1 * | 8/2005 | Holden | 439/144 |
| 6,970,351 | B2 * | 11/2005 | Perez et al. | 361/679.57 |
| 7,622,673 | B2 * | 11/2009 | Quijano | 174/50 |
| 7,700,876 | B2 * | 4/2010 | Nishikino et al. | 174/68.1 |
| 7,804,691 | B1 * | 9/2010 | Davis | 361/752 |
| 7,837,500 | B2 * | 11/2010 | Chen | 439/564 |
| 8,029,308 | B2 * | 10/2011 | Saruwatari | 439/373 |
| 2002/0068477 | A1 * | 6/2002 | Chen-Chiang et al. | 439/373 |
| 2006/0223359 | A1 * | 10/2006 | O'Connell et al. | 439/373 |
| 2009/0261214 | A1 * | 10/2009 | Beauchamp et al. | 248/74.1 |
| 2012/0208387 | A1 * | 8/2012 | Takeda | 439/310 |

FOREIGN PATENT DOCUMENTS

| | | |
|---|---|---|
| CN | 101646987 A | 2/2010 |
| CN | 201708378 U | 1/2011 |

(Continued)

*Primary Examiner* — Anthony Q Edwards
(74) *Attorney, Agent, or Firm* — Artegis Law Group, LLP

(57) ABSTRACT

Embodiments of the invention generally include apparatus for providing a positive locked connection for I/O devices to computing devices. In one embodiment, an external latching apparatus for an Input/Output (I/O) connection is provided. The external latching apparatus includes a main body and at least one latch. The main body includes a first surface configured to abut to an I/O card bracket and a second surface, parallel and spaced apart from the first surface. The at least one latch extends from the main body beyond the first surface. A plurality of parallel slots are formed in the second surface. Each slot is open on a bottom side of the body and is configured to receive a cable of an I/O cable assembly.

19 Claims, 6 Drawing Sheets

(56) References Cited

FOREIGN PATENT DOCUMENTS

| | | | |
|---|---|---|---|
| CN | 101976787 | A | 2/2011 |
| CN | 202308605 | U | 7/2012 |
| TW | 200843271 | A | 11/2008 |
| TW | 201042854 | A | 12/2010 |
| TW | M429246 | U | 5/2012 |

* cited by examiner

EXTERNALLY LATCHING I/O HOUSING

BACKGROUND OF THE INVENTION

1. Field of the Invention

Embodiments of the present invention relate generally to I/O cabling and, more specifically, apparatus for providing a positive locked connection for I/O devices to computing devices.

2. Background

Many devices connect to each other using cables typically made up of a number of wires assigned to pins located in connectors at the end of the cable. The connectors may be based on a standard with an agreed upon sizes and configurations. Some connectors are proprietary and require the original equipment manufacturer to supply replacement cables.

Certain institutions require the connections between the computing device and the I/O devices to be secure from accidental removal. Hospitals and financial institutions are examples of such institutions. Accidental removal of the I/O device may result in financial losses or in the extreme, possibly even death in those scenarios where I/O devices are providing critical medical support. To safeguard against such accidental removal of I/O cables, users have come up with simple and inventive ideas such as tying or taping the cable to the back of the computing device. Some manufacturers have come to offer secure latches for cables to ensure they are not accidentally removed from the intended coupled devices. These cables provide screws which require tools or internal spring type mechanisms which are expensive to tool for production. However, as protocols improve and devices become smaller, I/O connections have miniaturized as well. With the miniaturization of I/O devices, computers and connectors, little space is left for traditional latching mechanisms to securely attach these devices in a manner which safeguards against accidental removal.

For example, there are some I/O cables available that use screws external to the connector for added retention. However, the screws are difficult to use, especially in the tight spaces where these I/O cables are typically used. In many cases, the screws require more space on the I/O bracket than is available per industry standards and/or customer requirements.

However, many of today's mini I/O connectors do not have a latching mechanism to prevent accidental disconnection of supported devices. An internal latching mechanism could potentially be used on a mini I/O connector; however this would require new designs, and new tooling for both the male connector and female receptacle. The tooling required to make connectors and receptacles is quite complicated and expensive. Also, many devices use proprietary cables to attach specialty machines to computing device. The tooling for manufacturing latching devices for the myriad of cable configurations would be cost prohibitive.

Therefore there is a need in the art for an external latching apparatus which can secure existing standard or proprietary I/O cables to a computing device.

SUMMARY OF THE INVENTION

Embodiments of the invention generally include apparatus for providing a positive locked connection for I/O devices to computing devices. In one embodiment, an external latching apparatus for an Input/Output (I/O) connection is provided. The external latching apparatus includes a main body and at least one latch. The main body includes a first surface configured to abut to an I/O card bracket and a second surface, parallel and spaced apart from the first surface. The at least one latch extends from the main body beyond the first surface. A plurality of parallel slots are formed in the second surface. Each slot is open on a bottom side of the body and is configured to receive a cable of an I/O cable assembly.

In another embodiment, an external latching Input/Output (I/O) connection is provided that includes an elongated latching bracket. The elongated latching bracket is configured for coupling to an I/O card. The latching bracket includes a plurality of linearly aligned cable receiving openings and a plurality of latch receptacles linearly aligned with the cable receiving openings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention include an external latching apparatus for securing standard I/O cable assemblies having non-latching male connectors female I/O cards having standard receptacles. Some embodiments provide an external latch housing which may be integrated into the receptacles of I/O cards, while other embodiments may be added to existing I/O cards. In at least some embodiments, the latching apparatus is embodied in a housing that is external to both connector/receptacle, which reduces new tooling requirements and provides cable retention while using off-the-shelf connectors/receptacles that are ubiquitous, and for which tooling is readily available. Advantageously, the invention may be adapted for use in just about any connector (current and future), such as Mini DP, HDMI, mHDMI, and USB, among others.

An internal latching mechanism could potentially be used on a Mini Display Port connector; however this would require new designs, and new tooling for both the male connector of the cable assembly and female receptacle of the I/O card. The tooling required to make such internally latching connectors and receptacles is quite complicated and expensive. A new housing and bracket are required for the invention described herein, however the invention described below is much less expensive to implement than making a new custom connector and receptacle. Thus, a secure I/O cable assembly to I/O card connection, using the inventive external latching apparatus, may be obtained for existing standard I/O cable assemblies at significant savings while providing a secure connection not currently available in conventional designs.

Figure 1:
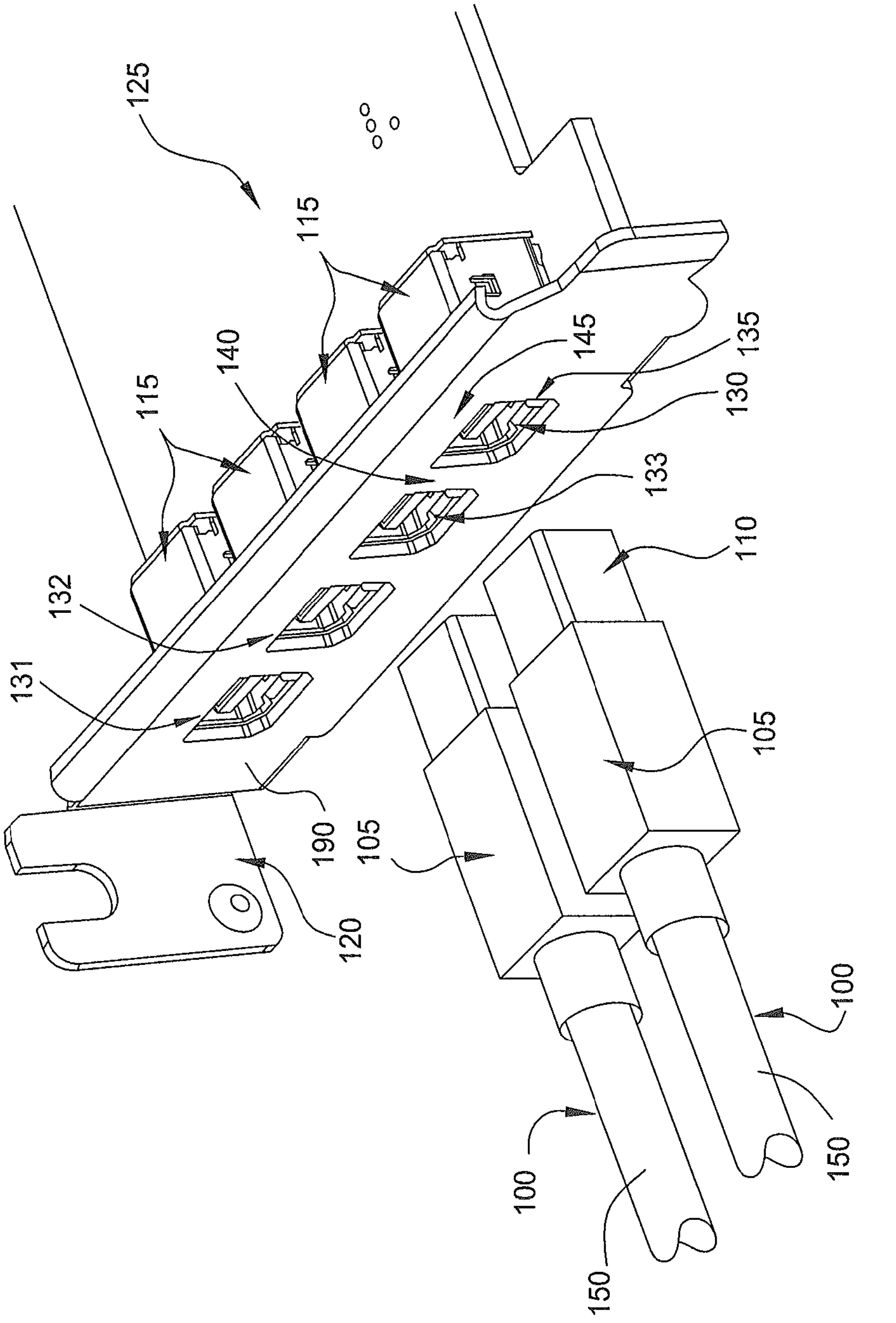
FIG. 1 illustrates a conventional Input/Output cable assembly along with an Input/Output card that includes a conventional I/O card bracket.

FIG. 1 illustrates a conventional Input/Output (I/O) cable assembly 100 along with a conventional I/O card 125. The I/O card has standard I/O receptacles (e.g., ports) 115 and a conventional I/O bracket 120. The I/O bracket 120 has a substantially planar face 190 though which a plurality of connector receiving openings 130, 131, 132 and 133 are formed. Collectively, the openings 130, 131, 132, and 133 are referred to as openings 135. The planar face 190 of the I/O bracket 120 includes a bracket wall 140 defined between the openings 130 and 133.

Two identical standard I/O cables assemblies 100 are show in FIG. 1. The standard I/O cables assemblies 100 have a conventional cable 150, a conventional housing 105 and a standard connector 110. The conventional housing has a rear 106 and a front 107. The connectors 110 may be any of the suitable I/O connectors, currently available or yet to be designed, such as HDMI™ and Mini DP™, among others. The standard I/O connector 110 may be configured as male or female connector, and in the embodiment depicted in FIG. 1, is configured as a male connector suitable for mating with a standard I/O receptacle 115.

The I/O card 125 may be a proprietary design, or based on an industry standard. The I/O cable assemblies 100 generally provide communication from external devices to a digital device in which the I/O card 125 is mounted. For example, an I/O card 125 may be a video card. The video card may be configured to support one or more display devices. Two display devices may be connected to the video card with the standard I/O cable assemblies 100. The digital display may have a display port which interfaces with the video card having the mini display ports standard I/O receptacles 115. As shown, the conventional I/O bracket 120 has four openings. However, conventional I/O brackets 120 may contain one or more openings as supported by the I/O card and provided by the available space on the bracket 120. The conventional I/O bracket 120 is designed such that the bracket wall 140 is wide enough to provide sufficient spacing between the openings 133 and 130 to provide sufficient clearance between neighboring housings 105 of the conventional I/O cable assemblies to connect to the I/O card 125.

The I/O devices may be an array of peripherals which are required to interface with a host computing device. The host computing device may not have built-in support for the I/O devices and require one or more I/O cards 125 to provide such support. Multiple devices supported on a single I/O card 125 may require multiple standard I/O receptacles 115. The standard I/O receptacles must be configured in a manner such that the standard I/O cable assemblies (for example 100) must not physically interfere with each other. The shrinking of the computing devices and the number of I/O connections have provided the driver for many standard connectors 110 to become smaller or miniaturized.

Certain industries require that uninterrupted communication is provided between devices. Typically a level of service is ensured through the use of batteries and latching devices for instrumentation cables. In the healthcare industry, a heart monitor may connect to a computing device with cables similar to the standard I/O cable assembly 100. As computing devices become smaller and as instrumentation and monitoring equipment become more complex, I/O connectors 110 have become smaller as well. However, even with miniaturization of standard I/O receptacles 115, space for traditional latching devices is often not available. Costs associated with these conventional I/O device latches must also be kept in check in order to successfully compete in the world marketplace.

Figure 2:
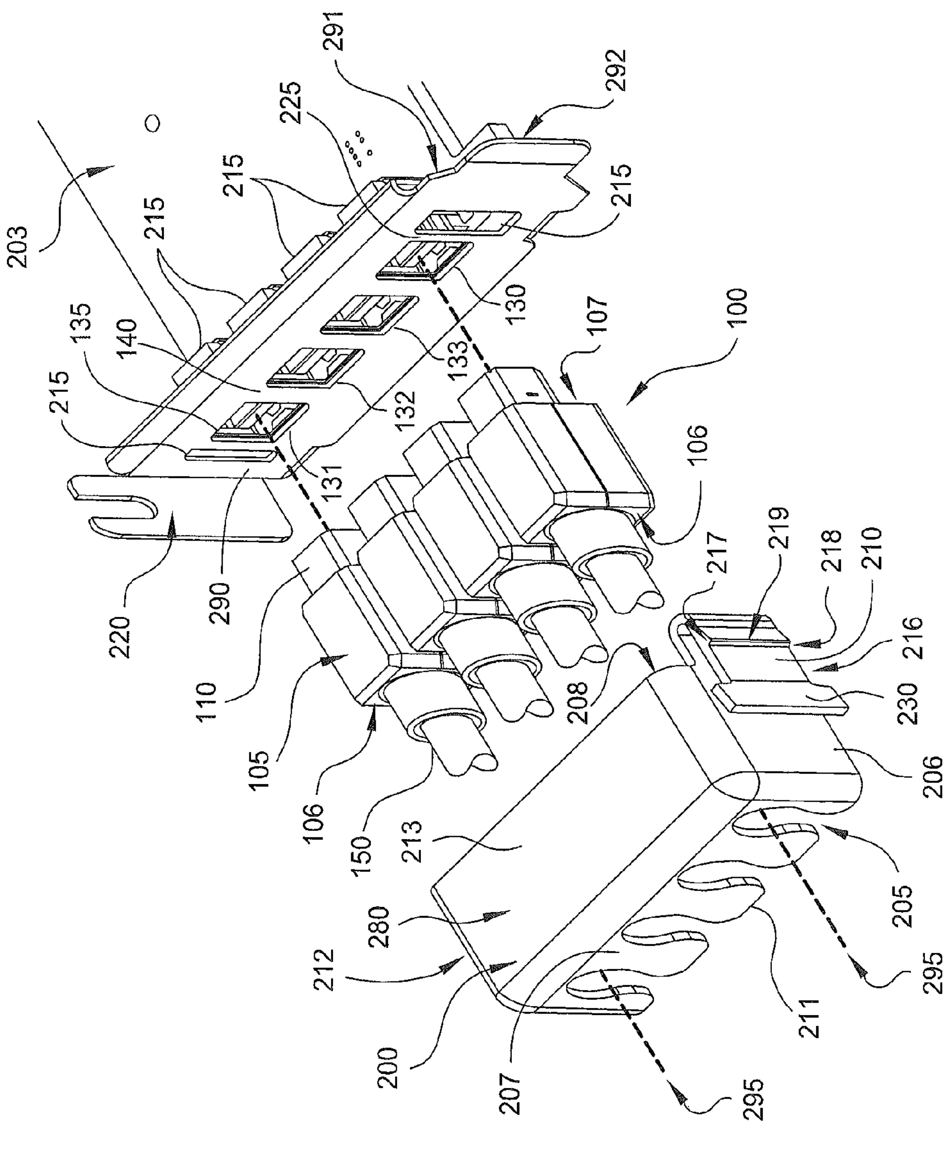
FIG. 2 illustrates an exploded perspective view of externally latching housing paired with a conventional I/O cable assemblies and Input/Output card, according to one or more embodiments of the invention.

FIG. 2 illustrates an exploded view of an external latching housing 200 for securing the connection between I/O cables and assemblies 100 and an Input/Output (I/O) card 203, according to at least one embodiment of the invention. The I/O card 203 is substantially the same as the I/O card 125 described with reference to FIG. 1, except in that the I/O card 203 includes an latching I/O bracket 220 configured to secure the connection of the I/O card 203 with the latching housing 200 having an external latch 210. For example, the I/O card 203 may be a video card, or other suitable device. The latching I/O bracket 220 has a substantially planar elongated face 290 through which a plurality of latch receptacles 215 and a plurality of connector receiving openings 135 are formed. Although only four connector receiving openings 130, 131, 132, 133 are illustrated in FIG. 2, it is contemplated that the latching I/O bracket 220 may be configured to have one or more openings 135. The openings 135 may be linearly aligned or arranged in another orientation. Each of the openings 135 is associated with a respective one of the latch receptacles 215.

The latch receptacles 215 are configured to mate with a respective external latch 210 of the externally latching housing 200 in a manner that allows the externally latching housing 200 to be releasably secured to the latching I/O bracket 220 of the I/O card 203. The latch receptacles 215 may be linearly aligned or arranged in another orientation. In at least one embodiment, the latch receptacles 215 and openings 135 arranged in a linear orientation. The planar face 290 includes a bracket wall 225 defined between each latch receptacle 215 and the associated connector receiving opening 130, 131, 132, 133. Since the latch receptacle 215 is not formed through the bracket wall 140 defined between the connector receiving opening 130, 131, 132, 133, the latch receptacle 215 provides room for the external latch 210 without interfering with the I/O card 125 or the I/O receptacles 115, and without reducing the density of cable spacing. As shown, the latching I/O bracket 220 has two external latch receptacles 215. However, the externally latching housing 200 may have one or more external latches 210 with corresponding external latch receptacles 215 on the latching I/O bracket 220. Also the size and orientation and of the latch receptacles 215 may be smaller or vary in location, such as above the openings 135, depending on the I/O connector 110 size and configuration.

In some embodiments, the latching I/O bracket 220 may be an original component of the I/O card 203. In some other embodiments, the latching I/O bracket 220 may replace the conventional I/O bracket 120 on a conventional I/O card 125 and transform the I/O card 125 into an I/O card 203 configured to secure the externally latching housing 200.

Although four I/O cable assemblies (100) are shown in FIG. 2, each I/O receptacle 115 of the I/O card 203 does not have to mate with an I/O cable assembly 100 for the externally latching housing 200 to properly secure the I/O connection. In at least one embodiment of the invention, the I/O cable assembly 100 is configured for connection to one receptacle 115 of the I/O card 203 through the opening 130 and externally latch 210 of the externally latching housing 200 is configured for connection to one receptacle 215 of the latching I/O bracket 220 of the I/O card 203. A connection between 100 and 203 is illustrated by phantom lines 295.

The externally latching housing 200 includes a main body 280 having one or more external latches 210 extending therefrom. The body 280 generally includes a first surface 208 and a second surface 207. The first surface 208 and second surface 207 are parallel and spaced sufficiently far apart as to accommodate the housing of the I/O cable assembly therebetween. The first surface 208 defines a planar face that abuts the planar face 290 of the latching I/O bracket 220 when the external latch 210 is disposed in the receptacles 215. The first surface 208 is sufficiently open or configured to allow cable assemblies 100 to extend out the housing 200. For example, the first surface 208 may be defined by the edge of the main body 280 or may include one or more openings or slots, such as shown by the opening 502 partially circumscribed by the surface 208 illustrated in FIG. 5.

Continuing to refer to FIG. 2, the second surface 207 is elongated and has a plurality of parallel slots 205 configured to accept I/O cable assembly 100. The orientation of the slots 205 is perpendicular to a long axis defining the elongation of the second surface 207. The slots 205 are open to a bottom 211 of the main body 280 of the externally latching housing 200. The slots 205 are arranged on the second surface 207 to align with the opening 502 of the first surface 208 such that a I/O cable assembly 100 may be slid into one of the slots 205 and opening 502 from the bottom 211 of the housing 200.

The main body 280 may include side surfaces 206, 212 and a top surface 213. The top surface 213 extends between and separates the first and second surfaces 208, 207, and also extends between and separates the side surfaces 206, 212. The edges of the side surfaces 206, 212 and the second surface 207 opposite the top surface 213 terminate at and define the bottom 211 of the main body 280.

The external latch 210 may include a displaceable arm 216 with a barb 217 that has a lip 218. The arm 216 is made from a resilient material and/or has a geometry that allows the arm 216 to be displaced with subjected to an external force and return to its substantially original position upon the removal of the external force, thus allowing the barb 217 and lip 218 to engage and release from the latching bracket 220 as further described below. In one embodiment, the arm 216 extends beyond the first surface 208 away from the main body 280 prior to doubling back to form a U-shape. (The barb 217 is disposed on a portion of the arm 216 that projects beyond the first surface 208 of the main body 280). The arm 216 terminates at a manual activator tab 230 that is flared away from the main body 280 to provide a convenient finger contact platform for displacing the barb 217 when disengaging the housing 20 from the bracket 220. The length of the barb lip 218 is selected to provide a surface that locks against a back surface 291 of the planar face 290 as to prevent the connector 110 from becoming inadvertently disengaged from the I/O card 203. In some embodiments, the arm 216 is flexible enough that a small force applied to the tab 230 will cause the arm 216 to deflect such that the barb 217 is displaced towards the main body 280. Removal of the small force from the tab 230 allows the arm 216 to return to the original position of the arm 216. This displacement of the arm 216 allows the barb 217 of the external latch 210 to align and slide into and out of the latch receptacle 215 of the latching I/O bracket 220 as further discussed below.

The barb 217 includes a sloped surface 219 facing away from the main body 280. The sloped surface 219 is oriented to deflect the arm 216 in a direction away from the lip 218 when sliding against the latching I/O bracket 220 as the barb 217 is inserted into the latching receptacle 215. Once the sloped surface 219 is moved past the latching I/O bracket 220, the arm 216 is free to more in the receptacle 215 towards the body 280 to allow the lip 218 of the barb 217 to engage the backside of the latching I/O bracket 220, thereby retaining the housing 200 against the latching I/O bracket 220.

The externally latching housing 200 and the external latch 210 may be manufactured as a single unitary component or as separate components. In one embodiment, the externally latching housing 200 is manufactured as a single component and fabricated from a polymer, such as a hard plastic or rubber material. In another embodiment, the externally latching housing 200 may be fabricated from a material softer than a material comprising the external latch 210. For example, the externally latching housing 200 may be over-molded with a harder material comprising the external latch 210.

The opening 135 are spaced apart to define a bracket wall 140 on the face 290 of the latching I/O bracket 220. The bracket wall 140 of the latching I/O bracket 220 may have the same width as the bracket wall 140 of the conventional bracket 120 described above, which allow the I/O cable assemblies 100 to solidly connect to the I/O card 203 without interfering with each other, other connections to the computing device, or with other equipment, and without increasing the spacing between the openings 135 and receptacles 215. Therefore, the latching I/O bracket 220 is capable of accommodating the same number of I/O cable assemblies 100 as a conventional bracket 120. That is, both brackets 120, 220 may support the same number of cable connections.

The external latch 210 inserts into and engages the latch receptacle 215 to secure the externally latching housing 200 which in turn secures the I/O cable assembly 100 from accidental disengagement from the I/O card 203. At least one latch receptacle 215 is positioned laterally outward of the openings 135. The latch receptacle 215 may be elongated, but may alternatively have variety of shapes and sizes. In one embodiment, the latch receptacle 215 is formed in an area of the face 290 defined between the opening 130 and a lateral edge 292 of the face 290. As the latch receptacle 215 is outward of the openings 135, the external latch 210 and the latch receptacle 215 do not occupy the area between the openings 135 so that the width of the bracket wall 140 may be minimized to maximize the number of additional I/O cable assemblies 100 that can be coupled to the I/O card 203. Further, having the latch receptacle 215 outward of the openings 135 allows the housing 200 to be easily engaged and disengaged from the latching I/O bracket 220 with interference from additional I/O cards and I/O cable assemblies that may be placed above and below I/O card 203.

In one embodiment, the latching I/O bracket 220 is nearly identical in shape and size as the conventional I/O bracket 120. The latching I/O bracket 220 is configured with a number of openings 135 corresponding to the number and location of receptacles 115 for a predetermined I/O card. Conventional I/O bracket 120 is typically attached to the I/O card 125 with screws to afford easy removal. Thus, the latching I/O bracket 220 may replace the conventional I/O bracket 120 to transform any I/O card 125 to the I/O card 203. Accordingly in at least one embodiment of the invention, the latching I/O bracket 220 is used to replace a conventional I/O bracket 120 on an I/O card 125, transforming the I/O card 125 to an I/O card 203 without replacing costly card circuitry. The use of the latching I/O bracket 220 allows for the computing device to securely connect the same number of I/O devices to the I/O card 203 without fear of a disconnection.

An I/O cable assembly 100 may utilize an externally latching housing 200 without modification, while the I/O card may be adapted to incorporate the latch receptacles 215 thereby enabling continued use of standard and proprietary connectors. The I/O cable assembly 100 may incorporate many of the standard I/O connectors 110 currently available in the marketplace, such as HDMI™ and Mini DP™, for example. In one embodiment of the invention, a conventional cable assembly 100 configured as a MINI DISPLAY PORT™ cable may utilize an externally latching housing 200 to provide secure uninterrupted connection to I/O card 203. However, the potential application of the externally latching housing 200 design extends beyond just graphics card products, and beyond currently available standard I/O connectors 110.

Figure 3:
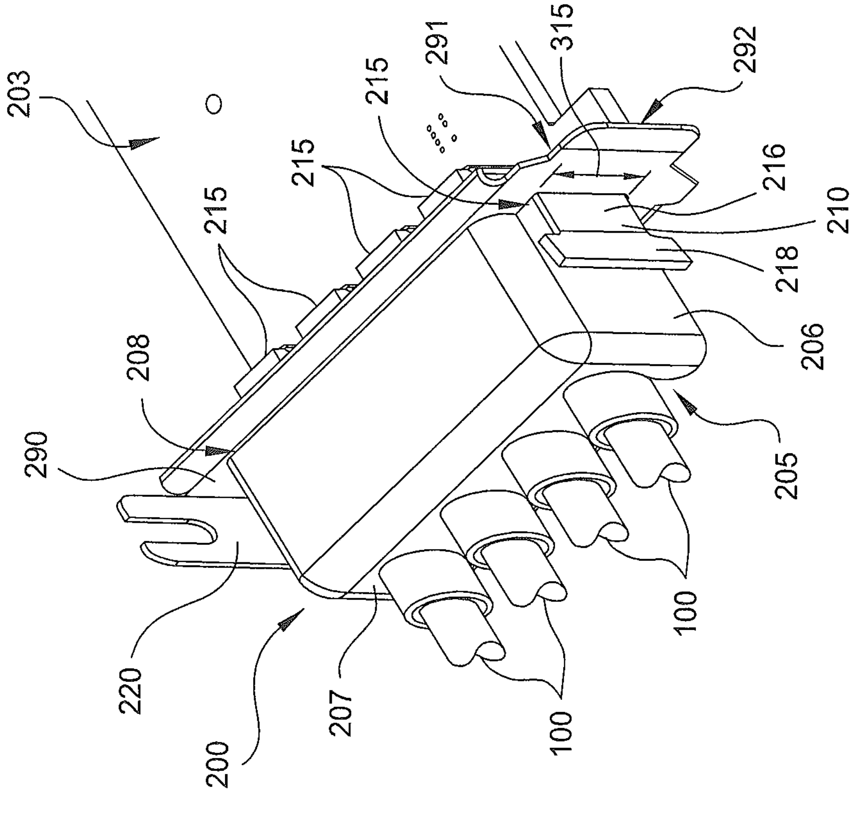
FIG. 3 illustrates a perspective view of externally latching housing securing a plurality of I/O cables to an Input/Output card.

FIG. 3 illustrates the externally latching housing 200 fully engaged with the latching I/O bracket 220 of the I/O card 203, according to at least one embodiment of the invention. The connector 110 for the I/O cable assembly 100 is inserted into I/O receptacle 115 until the housing front 107 contacts the latching I/O bracket 220 planar face 290. In one embodiment of the invention, the externally latching housing 200 slips over the I/O cable assembly 100 such that the cable 150 fits through the slot 205, while the connector 110 extends through the opening 502 of the first surface 208 beyond the first surface 208 of the housing 200 such that the I/O cable assembly 100 may be disposed perpendicularly through the housing 200. The externally latching housing 200 is slid toward the latching bracket 220 aligning the external latch with the latch receptacle and allowing the connector 110 to engage the receptacle 115 of the I/O card 203.

When the barb 217 of the housing 200 arm 216 is inserted into the latch receptacle 215, the sloped surface 219 contacts the surfaces of the face 290 surrounding the latch receptacle 215, thereby causing the latch arm 216 to deflect and allow the barb 217 to enter the latch receptacle 215. Once the barb 217 is through the face 290 and the connector 110 is mated with the receptacle 215, sloped surface 219 is no longer engaged with the I/O housing bracket 220, thereby removing the force that had displace the latch arm 216 and allowing the latch arm 216 to spring back to its at rest position and leaving the lip 218 engaged with the back surface 291 of the I/O housing bracket 220 and thus securely locking the externally latching housing 200 to the I/O card 203 while securing all I/O cable assemblies 100 to the same I/O card 203.

The I/O cable housing rear 106 (not visible in FIG. 3) is locked in place with a retainer further discussed below. The retainer prevents the I/O cable assembly 100 from being removed until the externally latching housing 200 is disengaged from the latching bracket 220.

To remove the externally latching housing 200 from the I/O card 203, the latch arm 216 is manually displaced thereby allowing the lip 218 to pass out the latch receptacle as the externally latching housing 200 is disengaged from the I/O card 203. The externally latching housing 200 is lifted clear of the I/O cable assemblies 100 so that the cable housings 105 are no longer captured against the I/O card 203, thus allowing the connectors 110 of the I/O cable assemblies 100 to be freely removed from the receptacles 115 of the I/O card 203.

The externally latching housing 200 has several advantages over conventional latching mechanisms utilized with conventional I/O cable assemblies 100. The external latch 210 provides secure mechanical retention for the I/O cable assemblies 100 to the I/O card 203 without altering either connector 110 of the I/O cable assembly or receptacle 115 of the I/O card 203. The externally latching housing 200 can be universally incorporated into a variety of standard I/O cable designs (current and future). The addition of the external latch 210 is compliant with most if not all industry specifications and can be used with many existing proprietary designs. The external latch 210 is also easy to engage and disengage without the use of tools which makes it ideal for use in confined and/or difficult to access spaces.

Although the housing 200 depicted in FIG. 2 illustrates the external latch 210 on the first surface 208 of the housing 200, the external latch 210 may alternatively reside on other surfaces of housing 200 such as the side surface 212 or the top surface 213. It is also contemplated that the configuration of the barb 217 may vary, for example such that the orientation of the sloped surface 219 is rotated to cause a lateral or opposite movement of the arm 216 to lock and/or unlock the housing 200 from the I/O card 203.

Figure 4:
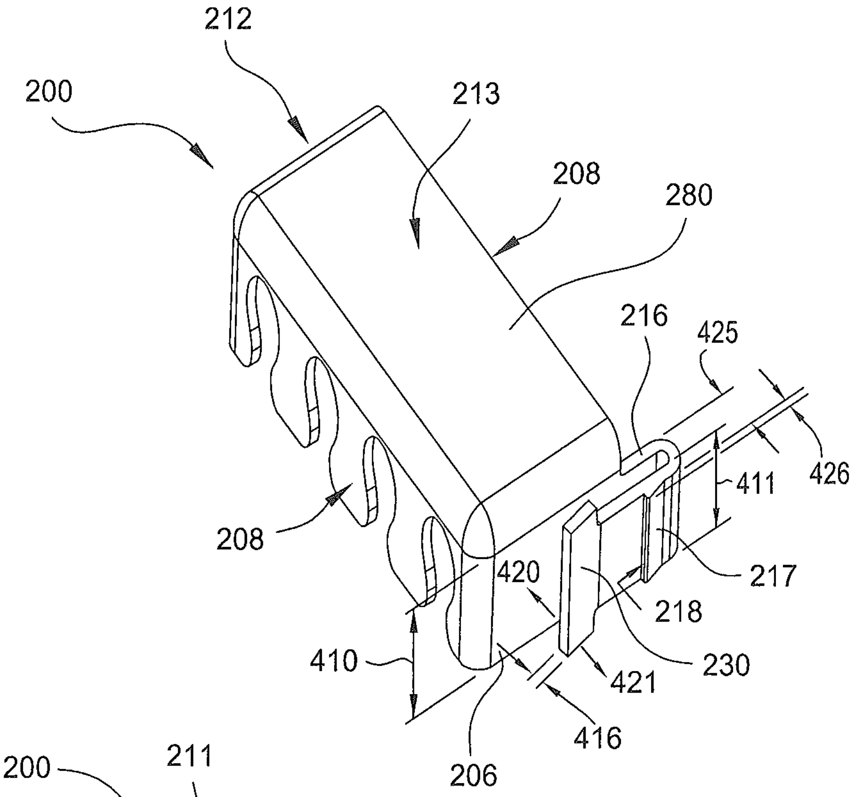
FIG. 4 illustrates a perspective top view of an externally latching housing, according to one or more embodiments of the invention.
Figure 5:
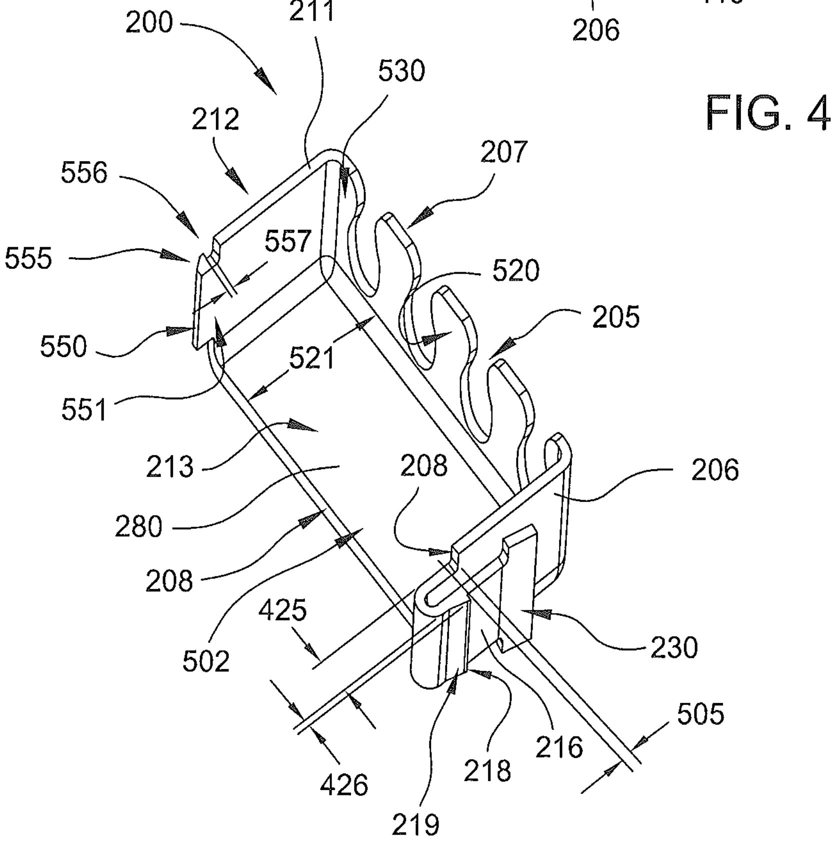
FIG. 5 illustrates a perspective bottom view of an externally latching housing, according to one or more embodiments of the invention.

FIG. 4 and FIG. 5 respectively illustrate a top down and a bottom up perspective views of the externally latching housing 200, according to at least one embodiment of the invention. FIG. 4 shows a side surface 206 with a height 410. The side surface 206 has a latch arm 216 with a height 411. The latch arm 216 can be displaced as shown by arrow 420 upon application of a force to the tab 230, the arm 216 resiliently returning to its original position upon removal 421. The latch arm 216, when not subject to external forces, has an at rest width 425. The width 425 is selected such that the arm 216 may enter the receptacle 215. The barb 217 has a barb height 426 which is also selected such that the barb 217 and arm 216 may enter the receptacle 215.

The present invention provides for at least one latch 210 on the housing 200. The locking of the housing 200 to the latching I/O bracket 220 utilizes opposing surfaces first surface 208 and lip 218. The first surface 208 is shown in FIG. 4 as part of the top surface 213 and the side surface 206, wherein the latch arm 216 has a height 411 less than the height 410 of the side surface 206. The first surface 208 may also be present on the side surface 212. However, in some embodiments, the first surface 208 may be present on the side surfaces 206, 212 only.

Referring now to FIG. 5, lateral separation between the first surface 208 and the lip 218 defines a distance 505. Distance 505 is slightly larger than the width of the main body 280 of latching bracket 220 such that latching bracket 220 fits snugly in the space provided between the lip 218 and the first surface 208.

As discussed above, the housing 200 has a retainer 520 which secures the I/O cable assembly 100 from sliding out the rear of the housing 200. The retainer 520 abuts the rear housing 106 of the I/O cable assembly 100. In the example provided, the retainer 520 is formed by an inside wall 530 of the second surface 207 surrounding each slot 205. The slot 205 is sized large enough to allow the cable 150 of the I/O cable assembly 100 to fit therethrough, but small enough to such that the inside wall 530 surrounding the slot 205 prevents the cable housing 105 from passing through the slot 205, thereby capturing the cable housing 105 between the inside wall 530 and the I/O cable bracket 220. The retainer 520 is offset a distance 521 from the first surface 208 such that the rear housing 106 of the I/O cable assembly 100 may abuts the inside wall 530 while the housing front 107 of the I/O cable assembly 100 substantially abuts the planar face 290 of the latching bracket 220.

Housing 200 is also shown with a side surface 212. The side surface 212 may include a second latch 550. The second latch 550 has an arm 551, a barb 555 and a lip 556. The lip 556 is offset a distance 557 from the first surface 208 which is the same as distance 505 from which the lip 218 is offset from the first surface 208, which is generally slightly more than the thickness for the planar face 290 of the latching I/O bracket 220. The second latch 550 may be configured the same as or different than the latch 210. In some embodiments, the second latch 550 may be a simple spear. In other embodiments, the second latch 550 may be a U-type spring latch or other type of latch. In yet other embodiments, the second latch 550 may be omitted.

Figure 6:
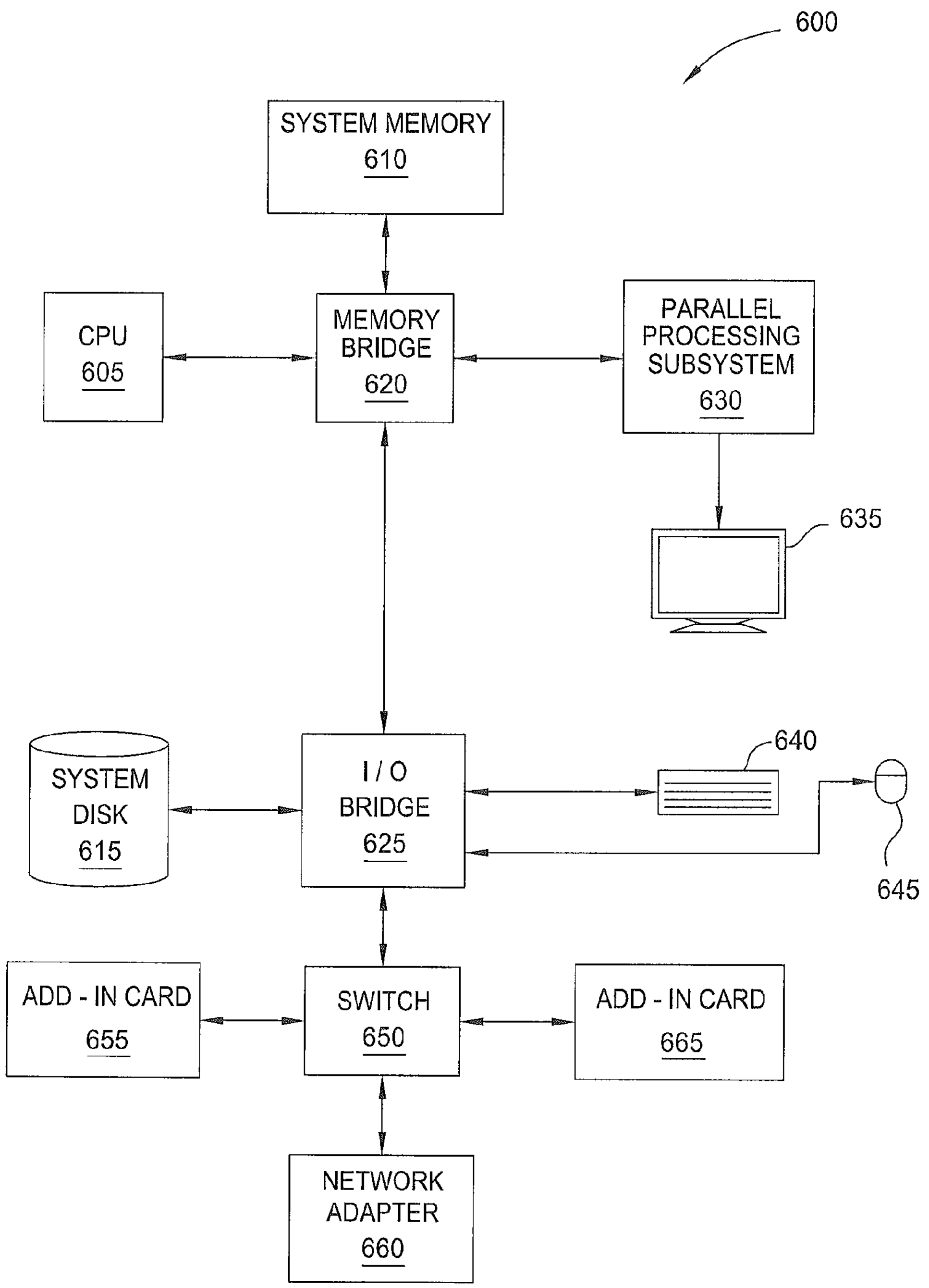
FIG. 6 illustrates a computing device in which one or more embodiments of the present invention can be implemented.

FIG. 6 depict one architecture of a computing system 600 within which embodiments of the present invention may be implemented. This figure in no way limits or is intended to limit the scope of the present invention. The computing system 600 may be a personal computer, video game console, electronic equipment, or any other device suitable for practicing one or more embodiments of the present invention. As shown, computing system 600 includes a central processing unit (CPU) 605 and a system memory 610 communicating via a bus path that may include a memory bridge 620. CPU 605 may include one or more processing cores, and, in operation, CPU 605 is the master processor of system 600, controlling and coordinating operations of other system components. System memory 610 may contain software applications and data for use by CPU 605. CPU 605 runs the software applications and optionally an operating system. Memory bridge 620, which may be, e.g., a Northbridge chip or integrated into the CPU 605, is connected via a bus or other communication path (e.g., a Hyper Transport link) to an I/O (input/output) bridge 625. I/O bridge 625, which may be, e.g., a Southbridge chip or other chip such a CPU 605, receives user input from one or more user input devices (e.g., keyboard 640, mouse 645, joystick, digitizer tablets, touch pads, touch screens, still or video cameras, motion sensors, and/or microphones) and forwards the input to CPU 605 via memory bridge 620.

A parallel processing subsystem (i.e., a display processor 630) is coupled to Memory Bridge 620 via a bus or other communication path (e.g., a PCI Express, Accelerated Graphics Port, or Hyper Transport link); in one embodiment display processor 630 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 610.

Display processor 630 periodically delivers pixels to a display device 635 (e.g., a screen or conventional CRT, plasma, OLED, SED or LCD based monitor or television). Additionally, display processor 630 may output pixels to film recorders adapted to reproduce computer generated images on photographic film. Display processor 630 can provide display device 635 with an analog or digital signal. In one embodiment, display processor 630 has an I/O card 203 configured to receive an externally latching housing 200 to secure one or more I/O cable assemblies 100 thereto. In another embodiment, display device 635 has a similarly configured I/O port and is attached to the display processor with an I/O cable secured by an externally latching housing 200.

A system disk 615 is also connected to I/O Bridge 625 and may be configured to store content and applications and data, such as a database library, for use by CPU 605 and display processor 630. System disk 615 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 650 provides connections between I/O Bridge 625 and other components such as a network adapter 660 and various add-in cards 655 or I/O cards 565. Network adapter 660 allows system 600 to communicate with other systems via an electronic communications network, and may include wired or wireless communication over local area networks and wide area networks such as the Internet. Add-in cards 655 and I/O cards 665 may be configured with a latch receptacle to receive an externally latching housing securing the I/O cables.

Other components (not shown), including USB or other port connections, film recording devices, and the like, may also be connected to I/O bridge 625. For example, a video processor may be used to generate analog or digital video output from instructions and/or data provided by CPU 605, system memory 610, or system disk 615. Communication paths interconnecting the various components in FIG. 6 may be implemented using any suitable protocols, such as PCI (Peripheral Component Interconnect), PCI Express (PCI-E), AGP (Accelerated Graphics Port), Hyper Transport, or any other bus or point-to-point communication protocol(s), and connections between different devices may use different protocols.

In one embodiment, display processor 630 incorporates circuitry optimized for graphics and video processing, including, for example, video output circuitry, and constitutes a graphics processing unit (GPU). In another embodiment, display processor 630 incorporates circuitry optimized for general purpose processing. In yet another embodiment, display processor 630 may be integrated with one or more other system elements, such as the Memory Bridge 620, CPU 605, and I/O Bridge 625 to form a system on chip (SoC). In still further embodiments, display processor 630 is omitted and software executed by CPU 605 performs the functions of display processor 630.

It will be appreciated that the system shown herein is illustrative and that variations and modifications are possible. The connection topology, including the number and arrangement of bridges, may be modified as desired. For instance, in some embodiments, system memory 610 is connected to CPU 605 directly rather than through a bridge, and other devices communicate with system memory 610 via Memory Bridge 620 and CPU 605. In other alternative topologies display processor 630 is connected to I/O Bridge 625 or directly to CPU 605, rather than to Memory Bridge 620. In still other embodiments, I/O bridge 625 and memory bridge 620 might be integrated into a single chip. The particular components shown herein are optional; for instance, any number of add-in cards or peripheral devices might be supported. In some embodiments, switch 650 is eliminated, and network adapter 660, add-in cards 655, and an I/O card 665, supporting externally latching I/O cables, are connect directly to I/O Bridge 625.

Figure 7:
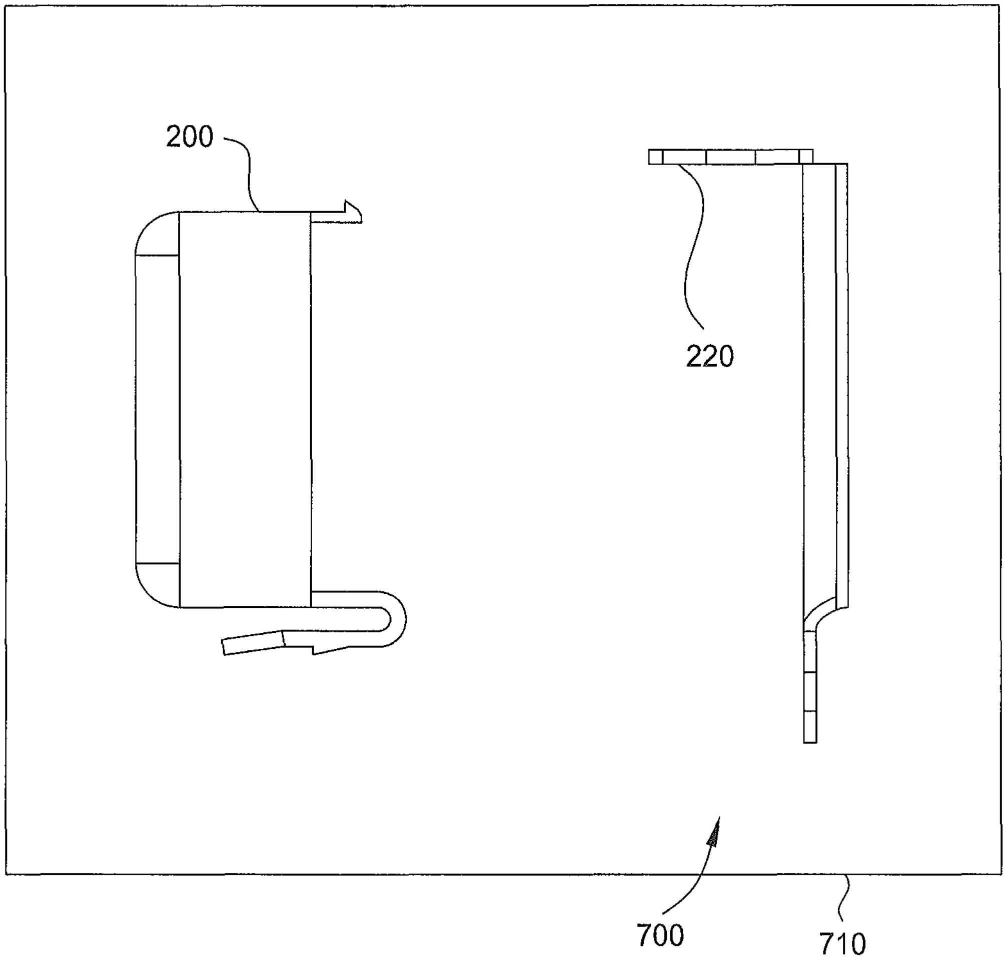
FIG. 7 illustrates an I/O latching kit, according to one or more embodiments of the invention.

FIG. 7 illustrates an I/O latching kit 700, according to one or more embodiments of the invention. The kit has a latching bracket 220 package 710 and a latching housing 200 package 705. The I/O latching kit 700 is configured for I/O cards with a certain number and type of I/O connections. The package 710 would contain a latching bracket 220 matched to the number and type of I/O connections available on the I/O card. The package 710 may be a polybag, a block blister pack or other container or packaging suitable for displaying and/or shipping the latching I/O bracket 220 and matching housing 200 as a pair. The latching housing 200 is configured to the work with the latching bracket 220. That is, a single port I/O card 125 would utilize an I/O latching kit 700 that has a latching bracket 220 configured with a single connector receiving opening 130. One skilled in the art can generate I/O latching kits 700 for the variety of I/O card configurations in the market place.

While the foregoing is directed to embodiments of the present invention, other and further embodiments of the invention may be devised without departing from the basic scope thereof, and the scope thereof is determined by the claims that follow.

What is claimed is:

1. An external latching apparatus for an Input/Output (I/O) connection, the external latching apparatus comprising:
- a main body comprising:
  - a first surface configured to abut to an I/O card bracket;
  - a second surface, parallel and spaced apart from the first surface; and
  - a plurality of parallel slots formed in the second surface and configured to receive a cable of an I/O cable assembly that comprises the cable and a cable housing, the slots open on a bottom side of the body, wherein each slot is sized large enough to allow the cable to fit therethrough, but sized small enough that the cable housing does not fit therethrough, and wherein a first distance from the first surface to the second surface is substantially equal to a second distance from a rear of the cable housing to a front of the cable housing; and
- at least one latch extending from the main body beyond the first surface.

2. The external latching apparatus of claim 1, wherein the at least one latch further comprises:
- an arm having a barb, the barb located beyond the first surface of the main body.

3. The external latching apparatus of claim 2, wherein the arm is cantilevered from the main body.

4. The external latching apparatus of claim 1, wherein the main body further comprises:
- a top surface coupling the first surface and the second surface.

5. The external latching apparatus of claim 4, wherein the main body further comprises:
- a first side surface and a second side surface each having edges defining the first surface, the side surfaces coupled by the top surface.

6. The external latching apparatus of claim 5, wherein the at least one latch extending from the main body beyond the first surface comprises:
- a first latch extending from the first side surface; and
- a second latch extending from the second side surface.

7. The external latching apparatus of claim 1, wherein the at least one latch extending from the main body beyond the first surface comprises:
- a first latch and a second latch disposed on opposite sides of the main body.

8. The external latching apparatus of claim 1, wherein the at least one latch extending from the main body beyond the first surface comprises:
- a laterally displaceable barb located beyond the first surface of the main body.

9. The external latching apparatus of claim 8, wherein the barb comprises:
- a lip and a sloped surface.

10. The external latching apparatus of claim 1, wherein the latch is over-molded.

11. The external latching apparatus of claim 10, wherein the latch comprises a material harder than the main body.

12. The external latching apparatus of claim 1, wherein the latch and main body are comprised of different materials.

13. The external latching apparatus of claim 1, wherein the latch and main body comprise a single unitary component.

14. An external latching Input/Output (I/O) connection comprising:
- an elongated latching bracket configured for coupling to an I/O card, the latching bracket comprising:
  - a plurality of linearly aligned cable receiving openings; and
  - a plurality of latch receptacles linearly aligned with the cable receiving openings;
- an external latching apparatus comprising:
  - a main body having a first surface configured to abut to an I/O card bracket, a second surface, parallel and spaced apart from the first surface, and a plurality of parallel slots formed in the second surface and configured to receive a cable of an I/O cable assembly, the slots open on a bottom side of the body; and
  - at least one latch extending from the main body beyond the first surface; and
- packaging securing the external latching apparatus and the elongated latching bracket as a pair.

15. An external latching apparatus for an Input/Output (I/O) connection, the external latching apparatus comprising:
- a main body comprising:
  - a first surface configured to abut to an I/O card bracket;
  - a second surface, parallel and spaced apart from the first surface; and
  - a plurality of parallel slots formed in the second surface and configured to receive a cable of an I/O cable assembly that comprises the cable and a cable housing, the slots open on a bottom side of the body, wherein each slot is sized large enough to allow the cable to fit therethrough, but sized small enough that the cable housing does not fit therethrough; and
- at least one latch extending from the main body beyond the first surface, the at least one latch comprising an arm having a barb located beyond the first surface of the main body, the arm extending beyond the first surface and away from the main body prior to doubling back to form a U-shape.

16. The external latching apparatus of claim 15, wherein the barb is disposed on the portion of the arm that projects beyond the first surface of the main body.

17. The external latching apparatus of claim 15, wherein the arm further comprises:
- a tab flared away from the main body.

18. An external latching apparatus for an Input/Output (I/O) connection, the external latching apparatus comprising:
- a main body comprising:
  - a first surface configured to abut to an I/O card bracket;
  - a second surface, parallel and spaced apart from the first surface; and
  - a plurality of parallel slots formed in the second surface and configured to receive a cable of an I/O cable assembly that comprises the cable and a cable housing, the slots open on a bottom side of the body, wherein each slot is sized large enough to allow the cable to fit therethrough, but sized small enough that the cable housing does not fit therethrough;
- at least one latch extending from the main body beyond the first surface; and
- a latching bracket configured for coupling to an I/O card, the latching bracket including:

a plurality of cable receiving openings, and a plurality of latch receptacles, each latch receptacle sized to releasably mate with an associated latch.

19. The external latching apparatus of claim 18, wherein the plurality of latch receptacles are linearly aligned with the plurality of cable receiving openings.

* * * * *